United States Patent [19]

Hammer et al.

[11] 4,221,821

[45] Sep. 9, 1980

[54] SHAPED ARTICLE COMPRISING A PERMANENTLY PLASTICIZED CELLULOSE COMPOSITION OF HIGH MECHANICAL STRENGTH AND PREPARATION THEREOF

[75] Inventors: Klaus-Dieter Hammer, Mainz; Günter Gerigk, Oberursel; Wolf-Rainer Neeff, Wiesbaden; Max Bytzek, Naurod, all of Fed. Rep. of Germany

[73] Assignee: Hoechst Aktiengesellschaft, Frankfurt am Main, Fed. Rep. of Germany

[21] Appl. No.: 855,980

[22] Filed: Nov. 30, 1977

[30] Foreign Application Priority Data

Dec. 1, 1976 [DE] Fed. Rep. of Germany ....... 2654418

[51] Int. Cl.² ............................................. C08L 1/06
[52] U.S. Cl. .................................... 426/420; 426/105; 426/415; 260/17.3; 264/195; 428/36
[58] Field of Search .............. 260/17.3; 426/135, 415, 426/652, 646, 420

[56] References Cited

U.S. PATENT DOCUMENTS

| | | | |
|---|---|---|---|
| 2,273,636 | 2/1942 | Gellendien et al. | 264/342 |
| 3,211,730 | 10/1965 | Orthner et al. | 544/220 |
| 3,937,672 | 2/1976 | Busch | 260/17.3 |
| 4,002,712 | 1/1977 | Hammer et al. | 264/194 |

FOREIGN PATENT DOCUMENTS

| | | | |
|---|---|---|---|
| 1414073 | 9/1965 | France | 264/194 |
| 2200282 | 4/1974 | France | 264/194 |
| 1044306 | 9/1966 | United Kingdom | 264/194 |
| 1201830 | 8/1970 | United Kingdom | 264/194 |
| 1259666 | 1/1972 | United Kingdom | 264/194 |
| 1417419 | 12/1975 | United Kingdom | 264/194 |
| 1493367 | 11/1977 | United Kingdom | 264/194 |

*Primary Examiner*—Edward M. Woodberry
*Attorney, Agent, or Firm*—Schwartz, Jeffery, Schwaab, Mack, Blumenthal & Koch

[57] ABSTRACT

A shaped article, especially a tubing, is disclosed which comprises a plasticized cellulose hydrate composition of high mechanical strength which is obtained by reacting a plasticized cellulose composition obtained by treating cellulose hydrate with a plasticity-enhancing amount of at least one plasticizing alkyl derivative which comprises an alkyl containing from about 8 to about 24 carbon atoms and which is selected from the group consisting of alkylamido-bis-dimethylene-triazinone-tetramethylol, alkylamino-bis-dimethylene-triazinone-tetramethylol, a substantially water insoluble ester of an aliphatic monocarboxylic acid containing from about 9 to about 25 carbon atoms, and a polyalcohol, such as glycerol or polyethylene glycol with a cyclic dimethylolurea derivative, and water and/or a plasticizer.

Such shaped articles can be prepared by mixing a viscose solution with a liquid containing the plasticizing alkyl derivative, introducing the resulting mixture into a precipitating bath, washing the precipitated shaped body in the gel state, treating it with an acidic solution of the cyclic urea compound and drying it in the heat. Tube-shaped articles are especially suited as sausage casings.

77 Claims, No Drawings

SHAPED ARTICLE COMPRISING A PERMANENTLY PLASTICIZED CELLULOSE COMPOSITION OF HIGH MECHANICAL STRENGTH AND PREPARATION THEREOF

BACKGROUND OF THE INVENTION

The invention relates to a continuous process for the preparation of permanently plasticized shaped articles of high strength, which comprise a chemically modified cellulose composition and possess a high swelling strength and a high mechanical strength as the result of the consolidation by means of crosslinking and are still adequately extensible due to their internal plasticizing.

Within the scope of the present invention, the term "shaped article" comprises fibers, strands, threads, tapes, and in particular, packaging material, such as, for example, films and especially tubings. In particular, the present invention relates to such a shaped article in the form of a tubing which further comprises in the wall thereof a reinforcement of fibrous material, in particular, a nonwoven fleece of paper fibers.

Shaped articles, manufactured by the process according to the present invention, in the form of tubing, especially fiber-reinforced tubing, are particularly suitable for use as an artificial sausage casing; artificial sausage casings of this type are not intended for human consumption.

It has been proposed to prepare crosslinked cellulose hydrate by a process wherein an aqueous liquid which contains a chemical crosslinking agent based on cyclic urea compounds containing at least two N-methylol groups and a secondary chemical plasticizer is allowed to act on shaped bodies of cellulose hydrate, which are in the gel state, and the shaped body is then subjected to an adequate heat treatment. Although the shaped articles which are manufactured by this known process possess a high mechanical strength and a high swelling strength due to the chemical crosslinking of the cellulose hydrate molecules, they are not permanently plasticized. The secondary chemical plasticizers can be extracted from the shaped article by means of a suitable solvent. Furthermore, this process has the disadvantage that "over-crosslinking" can readily occur in the shaped article and can cause an embrittlement of the material. This can take place because, depending on the length of time for which the material has been stored, a greater or lesser quantity of the introduced crosslinking agent reacts with the cellulose hydrate.

SUMMARY OF THE INVENTION

It is an object of the present invention to provide permanently plasticized chemically modified cellulose materials of high strength, in particular, films, which are useful as packaging material, e.g., for food, especially tubings which are useful as sausage casings and wherein the disadvantages of the prior art cellulose hydrate materials are avoided.

It is a further object of the present invention to provide such permanently plasticized cellulose material, especially for use as a sausage casing, which exhibits a high mechanical strength, yet retains a satisfactory suppleness for its intended use, even after any secondary plasticizer has been completely removed therefrom, e.g., during a sausage manufacturing process.

It is a further object of the present invention to provide shaped articles, in particular tubing, comprising such a permanently plasticized cellulose of sufficiently high mechanical strength, that the thickness of the shaped article, in particular, of the walls of a tubing, can be considerably reduced.

It is a further object of the present invention to provide such a shaped article in the form of a film or a tubing wherein the permeability for water vapor and gases, e.g., oxygen or $CO_2$, is reduced.

It is a further object of the present invention to provide such films and tubings wherein the mechanical strength is sufficiently high to impart to the article a satisfactory mechanical strength even when the thickness of the film or tubing walls is reduced.

It is still a further object of the present invention to provide a permanently plasticized cellulose material of high strength which is preferably suited for preparing sausage casings which comprise an inside coating of a moisture impermeable polymer and optionally a fibrous reinforcement, in particular, a permanently plasticized cellulose material of high strength which improves the properties and behavior of such sausage castings with respect to the shirring procedure to which sausage casings are usually submitted, and which has an appropriate shrinkability to readily adjust to the shrinkage of its content.

It is still a further object of the present invention to provide such a permanently plasticized cellulose material containing packaging material, e.g., a sausage casing, wherein the desirable properties of cellulose hydrate, in particular, its biological degradability, are retained, but which at the same time exhibit the desirable properties of packaging materials, which are made from synthetic polymers.

It is yet a further object of the present invention to provide a process for preparing shaped articles of permanently plasticized cellulose material of high strength, by which the disadvantages of the prior art processes are avoided.

Yet another object of the present invention is to provide such a process by means of which it is possible to manufacture shaped articles, in particular tubing, comprising a permanently plasticized cellulose material of high strength which, on the one hand is crosslinked to an adequate extent uniformly throughout its cross-section and at the same time is characterized by permanent softness by using a conventional manufacturing procedure, without applying additional process steps and without substantially modifying the customary and proven course of manufacture.

In order to accomplish the foregoing objects according to the present invention, there are provided shaped articles, especially films or tubes, which are adapted for packaging food, which include plasticized chemically modified cellulose compositions of high mechanical strength obtained by treating a plasticized cellulose composition obtained by treating cellulose hydrate with a plasticity-enhancing amount of at least one plasticizing alkyl derivative which comprises at least one alkyl group containing from about 8 to about 24 carbon atoms, and which is selected from the group consisting of alkylamido-bis-dimethylene-triazinone-tetramethylol, alkylamino-bis-dimethylene-triazinone-tetramethylol, a substantially water insoluble plasticizing ester of an aliphatic monocarboxylic acid containing from about 9 to about 25 carbon atoms, and a polyalcohol comprising at least two hydroxy groups at least one of which is esterified with said aliphatic monocarboxylic acid, and mixtures thereof, with at least one cyclic urea derivative containing at least two methylol groups, in particular, a cyclic dimethylolurea derivative having the formula

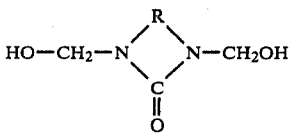

wherein R is a chain containing 2 or 3 chain atoms. Suitable cyclic dimethylolurea derivatives are those wherein R is a chain selected from the group consisting of $-CH_2-CH_2-$, $-CH_2-CH_2-CH_2-$, $-CH_2-O-CH_2-$, $-CH_2-CH_2-NH-$, $-CH_2-NH-CH_2-$, which is unsubstituted or substituted by lower alkyl, hydroxy, or lower hydroxyalkyl groups, and

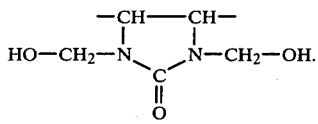

Optionally, the above shaped articles may further comprise water and/or a secondary chemical plasticizer.

According to the present invention, there is further provided a process for preparing the above described shaped articles which comprises the steps of:

(a) mixing a viscose containing solution and a liquid comprising at least one plasticizing alkyl derivative which comprises at least one alkyl containing from about 8 to about 24 carbon atoms and which is selected from the group consisting of alkylamido-bis-dimethylene-triazinone-tetramethylol, alkyl-amino-bis-dimethylene-triazinone-tetramethylol, a substantially water insoluble plasticizing ester of an aliphatic monocarboxylic acid containing from about 9 to about 25 carbon atoms, and a polyalcohol comprising at least two hydroxy groups at least one of which is esterified with said aliphatic monocarboxylic acid, and mixtures thereof, to form a liquid mixture;

(b) introducing the liquid mixture through the shaping orifice of a die into a precipitating liquid to precipitate a shaped body comprising the hydrated cellulose in a gel state and a plasticity-enhancing amount of said plasticizing alkyl derivative;

(c) washing the precipitated shaped body in the gel state;

(d) treating the washed shaped body in the gel state with an acidic aqueous solution containing at least one cyclic urea derivative containing at least two methylol groups, in particular a cyclic dimethylolurea derivative, having the formula

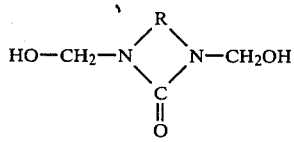

wherein R is a chain containing 2 or 3 chain atoms, to incorporate into the shaped body a sufficient amount of the cyclic dimethylolurea derivative to provide for a mechanical strength enhancing degree of crosslinking; and, (e) heat treating the treated shaped body to obtain a dried shaped article comprising the plasticized chemically modified cellulose composition of high mechanical strength.

The water content of the shaped article may be further adjusted to provide a desired degree of suppleness thereto, e.g., by moistening with water.

The tube-shaped articles according to the present invention are particularly useful as sausage casings. Accordingly, there is further provided according to the present invention a process for preparing sausages which comprise the step of filling the sausage material into an above described tube-shaped article.

Further objects, features and advantages of the present invention will become apparent from the detailed description of the invention and its preferred embodiments which follows.

DETAILED DESCRIPTION OF THE INVENTION

The permanent plasticization of the shaped articles according to the present invention is particularly important for their use in the form of tubing as an artificial sausage casing. Such a tubing, according to the present invention, remains sufficiently supple for its intended use as a sausage casing, even after all of the secondary plasticizer has been quantitatively removed from the tubing during the manufacture of sausages.

The shaped articles according to the present invention are characterized by a permanent softness. Permanent softness of the shaped article here means that the chemical agents which are incorporated therein and which effect a plasticization of cellulose hydrate, have no tendency to migrate out of the shaped article and are not extractable from it by water. The shaped articles manufactured by the process according to the invention, in particular those in the form of tubing for use as an artificial sausage casing, are superior to the shaped articles manufactured by known processes, with respect to the combination of properties mentioned.

According to the present invention, the permanently plasticized shaped articles, especially in the form of tubing, preferably fiber-reinforced tubing, comprising the plasticized chemically modified cellulose composition, are prepared analogous to the usual procedure wherein an aqueous alkaline viscose solution is forced through the shaping orifice of a die body into a precipitating liquid, the initial shaped body is treated with regenerating liquids and wash liquids, then heat acts on the formed structure and it is dried by heating, and, if appropriate, the resulting shaped body is moistened with water after drying. According to the process of the present invention, the aqueous alkaline viscose solution is mixed with a liquid containing the plasticizing alkyl derivative having at least one alkyl containing from about 8 to about 24 carbon atoms and the resulting mixture is forced through the shaping slit of a die body into the precipitating liquid to form the initially shaped body. After passing the shaped body through a wash liquid, an acid aqueous solution which contains dissolved therein the cyclic urea compound with at least two reactive methylol groups, is allowed to act on the initial shaped body which is in the gel state, and subsequently it is adequately heated and dried. If appropriate, the dried shaped article is then moistened with water in order to adjust its water content.

According to a preferred embodiment of the process of the present invention, the acid aqueous solution containing the cyclic urea derivative with at least two N-methylol groups, additionally contains a secondary chemical plasticizer dissolved therein.

The term "initially shaped body" is used to designate those shaped intermediate chemical products which are characterized by a spatial shape, yet which, due to their qualitative and quantitative chemical composition, in particular with respect to the molecular structure of their components, especially due to their high water content, have only a low dimensional stability, in particular no mechanical strength or only a comparatively low mechanical strength, as compared with the properties of the shaped article which is the end product of the process, and which differ from the end product of the process with respect to their spatial structure (density, physical homogeneity).

Within the present specification and claims, the definition "shaped article" is meant to denote the final product which is obtainable by the process according to the present invention (end product of the process).

Within the present specification, the term "viscose solution" is intended to denote a solution of cellulose xanthate dissolved in an aqueous alkaline medium. Viscose solutions of this type are known in the art. Within the process of the present invention, it is advisable to use a viscose solution which comprises the cellulose xanthate dissolved in about a 7% sodium hydroxide solution and which has a gamma value of from about 25 to about 35, and contains from about 82 to about 83% by weight of water, from about 7 to about 8% by weight of cellulose, from about 5.5 to about 7% by weight of pure NaOH bonded to cellulose and also about 2.5% by weight of sulfur bonded to cellulose.

According to another embodiment of the process, the liquid mixture contains the aqueous viscose solution and dispersed therein at least one plasticizing alkyl derivative which is a permanently plasticizing ester of an aliphatic, preferably saturated, monocarboxylic acid containing from about 9 to about 25, preferably about 15 to 18, and most preferably 17, carbon atoms, and an aliphatic alcohol having at least two, preferably primary, alcoholic hydroxy groups, at least one of which is esterified with said acid, or mixtures of esters of this type.

Among the aliphatic monocarboxylic acids, saturated acids are preferred. Yet, mono-unsaturated and polyunsaturated fatty acids, for example, oleic acid, linoleic acid, or linolenic acid, are also suitable as an acid component in the ester.

The esters may comprise only one type of acid component per molecule, or may comprise two or more different acid components per molecule. Thus, the unsaturated fatty acids may preferably be present as an additional acid component in the ester molecule, in addition to one of the above-mentioned saturated fatty acids.

In addition to the OH-groups which are esterified with the above-defined monocarboxylic acids, further hydroxy groups of the alcohol component within suitable permanently plasticizing esters may be esterified with a, preferably, aliphatic carboxylic acid, which contains at least one further functional group which is a hydroxy group or a carboxyl group, for example, a di- or tri-carboxylic acid or a hydroxycarboxylic acid containing one to three carboxyl groups. Aliphatic hydroxycarboxylic acids are preferred.

In particular, such aliphatic carboxylic acids containing from 2 to about 8 carbon atoms in their molecule chain are suitable; aliphatic hydroxycarboxylic acids, in particular, lactic acid or citric acid, are most preferred.

An example of a suitable aromatic hydroxycarboxylic acid is salicylic acid.

Preferably, the plasticizing esters are esters of at least one aliphatic monocarboxylic acid containing at least about 14, preferably from about 14 to about 20, most preferably about 17, carbon atoms, and preferably an aliphatic alcohol which contains at least two, preferably primary OH-groups. Among these alcohols, the following are particularly preferred: lower alkyl polyols containing 2 to about 6 carbon atoms and 2 to about 6 hydroxy groups, such as:

(1) lower alkyl diols, e.g., ethanediol, propanediol, butanediol, and lower alkyl tri- or tetraols, e.g., glycerol and pentaerythritol;

(2) lower alkyl penta- and hexaols, such as sorbitol, mannitol, dulcitol, glucose and sucrose;

(3) polyethers of the above lower alkyl polyols, for example, polyglycols, such as polyethylene glycols of the general formula

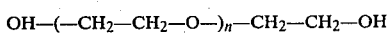

in which n is an integer in the range of from 1 to about 50, preferably an integer of from about 10 to about 25, in particular, diglycol, triglycol, polyethylene glycol-200 and polyethylene glycol-1000, and also polypropylene glycols of the general formula

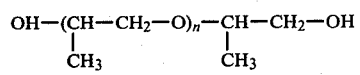

in which n is an integer of from 1 to about 50, preferably an integer of from about 10 to about 25.

Polyglycols which are suitable as the alcohol component of the esters, preferably have a molecular weight of between about 200 and about 4,000.

(4) branched or unbranched aliphatic higher-molecular alcohols which contain more than two OH-groups and which are formed by ethoxylation and/or propoxylation of lower polyols, preferably tri- or tetraols, such as glycerol, diglycerol, trimethylolmethane or pentaerythritol. Advantageously, all of the hydroxy groups of the polyols are substituted by an ethylene oxide- or propylene oxide chain, and which may comprise up to about 50, in particular, from 3 to about 20, ethylene oxide units and/or propylene oxide units.

The above defined esters which represent an essential constituent of the shaped articles are capable of permanently plasticizing cellulose hydrate and therefore the abbreviated term "permanently plasticizing esters" is used in the following text to designate these esters.

A process for preparing a shaped article comprising a plasticized cellulose hydrate composition comprising cellulose hydrate and a permanently plasticizing ester is described in our co-pending application, which claims priority of our German Patent application No. P 26 54 427.4 the disclosure of which is hereby incorporated by reference.

According to another embodiment of the process according to the present invention, the liquid mixture contains the aqueous alkaline viscose solution and dissolved therein at least one plasticizing alkyl derivative suitable for permanently plasticizing cellulose hydrate which contains four methylol groups and one alkyl having from about 9 to about 24, preferably about 15 to 18, and most preferably 17, carbon atoms, as are described in the Belgian Pat. No. 823,410, the disclosure of which is hereby incorporated by reference, and which, in particular, is an alkylamido-bis-dimethylene-triazinone-tetramethylol and/or an alkylamino-bis-dimethylene-triazinone-tetramethylol, wherein the alkyl contains from about 9 to about 24, preferably 15 to 18, and most preferably 17, carbon atoms, or mixtures thereof.

According to another embodiment of the process of the present invention, the liquid mixture contains the aqueous alkaline viscose solution and dispersed therein at least one permanently plasticizing ester, as well as dissolved therein, an alkylamido-bis-dimethylene-triazinone-tetramethylol and/or an alkylamino-bis-dimethylene-triazinone-tetramethylol, in particular stearylamido- and/or stearylamino-bis-dimethylene-triazinone-tetramethylol. It is also possible to use as permanently plasticizing esters a blend of such permanently plasticizing esters each having a different chemical structure.

The chemical structure of alkylamino-bis-dimethylene-triazinone-tetramethylol and alkylamido-bis-dimethylene-triazinone-tetramethylol and their preparation is known in the art and is described in the German Pat. No. 1,181,909. Viscose solutions which contain alkylamino- or alkylamido-bis-dimethylene-triazinone-tetramethylol, are described in Belgian Pat. No. 823,410, the disclosure of which is hereby incorporated by reference.

The total amount of plasticizing alkyl derivatives which are capable of permanently plasticizing cellulose hydrate, which is contained in the aqueous alkaline viscose solution, is from about 0.5 to about 40% by weight, advantageously between about 5 and about 25% by weight, relative to the amount of cellulose therein.

If the aqueous alkaline viscose solution contains, as a plasticizing alkyl derivative, exclusively the permanently plasticizing above defined esters, these are present in the viscose solution in a total amount of from about 0.5 to about 40% by weight, preferably of from about 1 to about 20% by weight, relative to the amount of cellulose therein.

If the process is carried out with an aqueous alkaline viscose solution which, in addition to the viscose, contains dissolved therein as the only plasticizing alkyl derivative the tetramethylol compounds which have been described in more detail above, such as, alkylamido- and/or alkylamino-bis-dimethylene-triazinone-tetramethylol, in particular stearylamido- and/or stearylamino-bis-dimethylene-triazinone-tetramethylol, these are contained in the solution, preferably in a total amount thereof of from about 0.5 to about 40% by weight, advantageously of from about 5 to about 20% by weight, relative to the amount of cellulose in the solution.

If, according to one of the embodiments of the process, in addition to the aqueous alkaline viscose solution, the liquid mixture contains both permanently plasticizing esters and the above described alkyl derivatives which contain methylol groups and a long-chain alkyl group, the liquid mixture advantageously comprises about 10% by weight of each, relative to the amount of cellulose.

The liquid mixture can also contain blends of permanently plasticizing esters of differing chemical structure, and the same also applies to the alkyl derivatives containing methylol groups and a long-chain alkyl group.

The liquid mixture can also contain a mixture of the two above-mentioned blends.

Preferably the total amount of permanently plasticizing esters in the liquid viscose containing mixture essentially consists of glycerol monostearate or polyethylene glycol-1000 monostearate or a mixture of the two in the ratio 1:1, or of glycerol monostearate-monocitrate or -monostearate-, -monolactate or a mixture of these above-mentioned mixed esters.

In order to prepare the liquid mixtures which contain permanently plasticizing esters dispersed therein, an aqueous alkaline viscose solution is mixed with a suitable amount of an aqueous dispersion of the permanently plasticizing ester, wherein the total amount of dispersed material is between about 15 and about 25% by weight, relative to the total weight of the aqueous dispersion.

To prepare the aqueous dispersion containing the permanently plasticizing esters, known dispersing aids, such as, for example, alkyl-, aryl- or alkyl-aryl sulfonates or -sulfates, are advantageously used in amounts of between about 1 and about 5% by weight, preferably between about 3 and about 4% by weight, relative to the amount of dispersed material in the dispersion.

The dispersing agents assist in uniformly distributing the permanently plasticizing ester in the aqueous liquid.

The aqueous liquid, wherein the permanently plasticizing esters are dispersed, may comprise a major portion of water and, in addition thereto, a minor portion of a preferably water soluble organic solvent, such as, a lower alkyl alcohol, for example, ethanol, butanol, propanol or isopropanol.

However, the liquid containing permanently plasticizing esters can also be a solution of the ester in a suitable preferably water miscible organic solvent, such as, for example, alcohols, in particular aliphatic alcohols.

The following are examples of preferred permanently plasticizing esters or mixtures thereof, for carrying out the process:

(a) glycerol monostearate or glycerol distearate or mixtures thereof;

(b) polyethylene glycol-1000 monostearate or polyethylene glycol-1000 distearate or mixtures thereof;

(c) a mixture of equal parts of glycerol mono- or distearate and a polyethylene glycol-1000, mono- or distearate;

(d) glycerol monostearate wherein one OH-group is esterified with lactic acid or citric acid or mixtures of these di-esters;

(e) polyethylene glycol-1000 monostearate wherein one OH-group is esterified with lactic acid or citric acid or mixtures of these di-esters; or, (f) mixtures of the esters which are cited above under (a) through (e).

It is essential for the permanently plasticizing effect of the plasticizing esters in the shaped article that these esters are insoluble, or substantially insoluble in water. They are thus not extractable with water from the shaped article.

In the manufacture of the shaped articles, ready dispersibility of the permanently plasticizing esters is important whenever they are to be used in the form of aqueous dispersions.

The liquid mixture containing the vicose and the permanently plasticizing alkyl derivative, is prepared by mixing an alkaline aqueous viscose solution with an appropriate amount of an aqueous dispersion of the permanently plasticizing ester and/or with an appropriate amount of an aqueous solution of suitable concentration of plasticizing alkyl derivative containing methylol groups. The aqueous solutions of the alkyl derivatives containing methylol groups, preferably stearylamido- or stearylamino-bis-dimethylene-triazinone-tetramethylol, preferably contain about 24% by weight of the dissolved methylol compound, relative to the total weight of the solution.

Preferably, an aqueous alkaline viscose solution of a type which has the following characteristic data is used:
cellulose content 7% by weight,
alkali content 5.8% by weight, each relative to the total weight of the solution;
gamma value 29.4;
NaCl ripening value 2.50;
viscosity of the solution in a falling ball viscometer 137 seconds (measured at 20° C.).

Within the scope of the description of the present invention, the term "secondary chemical plasticizer" is to be understood as those water soluble chemical compounds which, due to their molecular structure, are capable of having a plasticizing effect on shaped cellulose hydrate articles into which they are introduced. Due to their solubility in water, they are extractable from the shaped article when the latter is treated with water.

The secondary chemical plasticizers are therefore not suitable for permanently plasticizing the shaped article. Examples of suitable secondary chemical plasticizers are water soluble lower alkyl polyols, such as glycerol or glycol, and ethoxylated derivatives thereof, such as polyethylene glycols. The use of these chemical substances as plasticizers is well known in the art.

Suitable cyclic dimethylolurea derivatives are those wherein R is a chain selected from the group consisting of $-CH_2-CH_2-$, $-CH_2-CH_2-CH_2-$, $-CH_2-O-CH_2-$, $-CH_2-CH_2-NH-$, $-CH_2-NH-CH_2-$, which is unsubstituted or substituted by lower alkyl, hydroxy or lower hydroxyalkyl groups, and

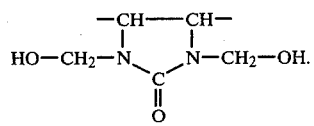

Preferably in the process according to the present invention, acidic aqueous solutions of the following known reactive urea derivatives are used: dimethylol-ethylene-triazinone, or 3,5-dimethylol-3,5-diaza-tetrahydropyrone-4, dimethylol-hydroxy-propyleneurea, or dimethylol-tetramethyl-propyleneurea, in particular dimethylol-ethyleneurea (1,3-dimethylol-imidazolidone-2), or dimethylol-dihydroxy-ethyleneurea (1,3-dimethylol-4,5-dihydroxy-imidazolidone-2), or tetramethylol-acetylene-diurea, dimethylol-propyleneurea, or mixtures of the before named compounds.

Preferably the acid aqueous solutions of the cyclic dimethylolurea derivatives have a pH value of from about 2 to about 2.5, and also contain a secondary chemical plasticizer, for example, glycerol, in addition to the urea derivative.

The aqueous solution preferably contains dissolved therein an amount of the cyclic dimethylolurea derivative capable of crosslinking cellulose hydrate of from about 0.5 to about 20% by weight, preferably an amount of between about 2 and about 10% by weight, and most preferably an amount of about 5% by weight.

The aqueous acid solution can also contain mixtures of chemically different cyclic urea compounds possessing at least two N-methylol groups.

Preferably the aqueous solutions additionally contain a secondary chemical plasticizer, for example, glycol, polyglycol or glycerol dissolved therein. The total amount of the secondary plasticizer in the solution preferably is from about 8 to about 15% by weight, relative to the total weight of the solution. Mixtures of chemically different secondary plasticizers may also be used.

The crosslinking reaction between reactive methylol groups of cyclic urea compounds and OH-groups of cellulose hydrate molecules, is an acid-catalyzed chemical reaction. This crosslinking leads to an increase in the mechanical strength and the swelling strength of cellulose hydrate.

The aqueous solution of the cyclic urea compound preferably has a pH value smaller than 7, preferably smaller than 5, and in particular a pH value of from about 1.5 to about 3. The pH value of the solution is adjusted by adding a corresponding amount of an acid to the solution. For example, the following acids are suitable as a crosslinking catalyst: mineral acids such as sulfuric acid, hydrochloric acid, or organic acids such as acetic acid, tartaric acid, oxalic acid, propionic acid, formic acid or other acids of a similar activity.

In some cases, water soluble salts which are known as accelerators for a crosslinking reaction, e.g., salts of a strong acid or a weak base, for example ammonium chloride, magnesium chloride, zinc chloride or zinc nitrate, can also be used in place of the acids. These salts preferably are then present in the aqueous solution of the cyclic urea compound, in an amount of between about 1 and about 5% by weight, relative to the amount of the cyclic urea compound in the solution.

The acid liquid containing the cyclic urea compound can also contain both said acids and said salts of strong, preferably inorganic, acids with weak, preferably inorganic, bases as the catalytically active agents.

During the treatment of the shaped body, according to the process of the present invention, the acidic aqueous solution of the cyclic dimethylolurea derivative which, if appropriate, comprises a secondary chemical plasticizer dissolved therein, advantageously is heated to a temperature of between about 20° and about 90° C., most preferably to a temperature of between about 40° and about 80° C., and in particular to a temperature of about 60° C.

Preferably, the aqueous acid solution of the cyclic dimethylolurea derivative which, if appropriate, additionally comprises a secondary chemical plasticizer and a catalyzing chemical agent, is allowed to act on the shaped body, in particular a tube-shaped body, for a period of time of from about 1 to about 20 minutes.

During this treatment, the shaped body, e.g., the tube-shaped body, is strongly swollen; it is in the gel state.

The shaped articles which are manufactured by the process according to the present invention, contain between about 5 and about 25% by weight of water, preferably between about 8 and about 12% by weight of water, relative to the total weight of the shaped article. Advantageously, the shaped articles further contain a secondary chemical plasticizer in an amount of between about 1 and about 35% by weight, preferably between about 8 and about 25% by weight, relative to the total weight of the shaped article.

In addition to the above defined essential components, water and, if appropriate, a secondary chemical plasticizer, the shaped articles manufactured by the process according to the present invention do not contain any other chemical substances in amounts which adversely affect the favorable properties of the shaped article.

The amounts of chemical crosslinking catalyst and/or chemical dispersing aid which may be contained in the shaped article, are negligibly low and have no influence on the properties of the shaped article.

By way of example, the process will be further described in the following text, using the preferred embodiment of manufacturing a shaped article in the form of tubing as an example.

A liquid mixture containing an aqueous viscose solution and a permanently plasticizing ester, for example, glycerol monostearate, is pressed through the annular slit orifice of a die body into a conventional precipitating liquid. The initially shaped body emerging from the annular slit die and entering into the precipitating bath has the shape of a tubing.

Preferably, a precipitating liquid is used which is known in the art under the name "Müller bath"; and consists of an aqueous solution of $H_2SO_4$. For example, it may contain about 15% by weight of $H_2SO_4$ and 17% by weight of $Na_2SO_4$, relative to its total weight. When the viscose solution enters into the precipitating bath, the viscose sol is transformed into a viscose gel.

The shaped article is guided through the precipitating bath, at a speed of, for example, 10 m/minute.

The initially shaped body is then successively subjected to the action of several conventional regenerating fluids which each comprises an aqueous solution of a different amount of sulfuric acid, whereby the acid concentration is increased in each case. For example, the precipitating bath which is used first may have a concentration of, for example, 0.5% by weight of sulfuric acid and the precipitating bath which is used last may then have a concentration of, for example, 3% by weight of sulfuric acid. The treatment with the regenerating liquids is effected by passing the shaped body continuously through different troughs each of which is filled with the corresponding liquid.

Subsequent to the regenerating treatment, the shaped body is treated with water, preferably at a temperature of about 60° C., by passing it through a trough filled with this water. The resulting shaped body in the gel state (water content 270–330% by weight) is then subjected to the action of an aqueous solution which contains dissolved therein the reactive cyclic dimethylolurea derivative, a secondary chemical plasticizer, for example, glycerol, and a catalyst, for example, sulfuric acid, by passing it through a trough which is filled with said solution. The solution has, for example, a temperature of 60° C. and a pH value of 2.5.

Preferably, the process is carried out in such a way that the acid aqueous solution, which contains a cyclic urea derivative and, if appropriate, in addition, a secondary chemical plasticizer, is allowed to act only on the outside of the tubing. However, this solution can also be made to act on the outside and on the inside, or only on the inside, of the tubing.

A treatment of the inside of the tubing can be effected in a known manner, e.g., as is described in the British Pat. No. 1,201,830, the disclosure of which is hereby incorporated by reference.

The period of time for the treatment of the tubing with the above mentioned aqueous solution is adjusted in such a way that it corresponds to allowing a hypothetical tubing section to remain in the solution for a period of time of between about 120 minutes and about 30 seconds, in particular, a period of time of between about 30 minutes and about 1 minute, and especially a period of about 5 minutes.

The tubing is then heated to a temperature of between about 70° and about 140° C., preferably of between about 90° and about 120° C., for example, a temperature of about 110° C.

The heating of the tubing is effected, for example, by passing the tubing at a constant speed through a drying tunnel of suitable length, for example, a tunnel of 50 m length, charged with hot air of an appropriate temperature. Thereby, the residence time in the drying tunnel is from about half a minute to about 20 minutes, depending on the speed of the movement of the tubing in the direction of the longitudinal axis of the tunnel. This speed preferably is from about 5 to about 30 m/minutes.

The tubing which is manufactured in this way, has a residual water content of from about 8 to about 12% by weight, and can subsequently be heated to a temperature of from about 100° to about 150° C., by passing it through a further drying tunnel at a speed which corresponds to a residence time of a hypothetical circular ring section of the tubing in the tunnel of from about 30 seconds to about 20 minutes, whereby a higher temperature is associated with a shorter heating period.

During the heating, the tubing is maintained in an inflated state by means of introducing a supporting amount of air into the interior of the tubing.

The drying tunnel is operated with hot air of a temperature which suffices to heat the tubing to the desired temperature, whilst it passes through the tunnel.

The supporting air is introduced into the tubing before the drying is started. Before moving into the drying tunnel, and likewise after leaving the drying tunnel, the tubing is passed through a pair of squeeze rollers. The tubing which has been dried in this manner is then adjusted to a water content of from about 8 to about 12% by weight, relative to its total weight, by moistening it with water.

The last mentioned heat treatment effects a satisfactory crosslinking of the cellulose material by means of the chemically reactive compounds within a sufficiently short period of time.

The crosslinking of the material forming the shaped article, which has been initiated, and at least partly completed, by the action of heat in the course of the drying processes, continues subsequent to the drying, when the shaped article is stored at room temperature.

The swelling value of the shaped article is determined according to instructions which are described in "Färberei—und textiltechnische Untersuchungen" ["Investigations on Dyeing and Textile Technology"], Herrmann Agster, Springer-Verlag, 1956, page 400, or in "Zellcheming-Merkblatt" VI/33/57.

Within the scope of the invention, a shaped article which takes up 270 to 330% by weight of water, relative to its total weight, is assumed to be in the gel state.

The process according to the present invention makes it possible to manufacture shaped articles, in particular tubing, of a cellulose composition which are substantially improved with respect to a large number of properties, as compared with the prior art shaped articles, in particular tubing, of cellulose hydrate. With the aid of the process according to the present invention, the swelling value of the shaped article can be adjusted within wide limits and its strength can be increased without the material becoming brittle or fragile thereby. The shaped article which is manufactured by the process according to the present invention shows a higher dimensional stability and a decreased permeability for water vapor and oxygen as well as for $CO_2$.

Thus, the properties of the shaped article comprising the chemically modified cellulose composition according to the present invention, are altered to become more similar to that of plastics, yet, at the same time, the advantageous properties of shaped articles of cellulose hydrate, which above all, include their biological degradability, are maintained.

A further advantage of the process is that, due to the improved physical properties of the shaped articles, in particular tubing, which are manufactured in this way, it is possible to reduce the thickness of the shaped article, in particular, the thickness of the wall of a tubing, without adversely affecting their properties during its later use.

Another advantage of the shaped article, in particular tubing, which is manufactured by the process according to the present invention, is the increased wet strength of the articles which considerably enhances their value for its intended use, in particular, when the tubing is employed as an artificial sausage casing.

The advantageous dimensional stability of the shaped articles which are manufactured by the process is an especially important property in use, above all for tubing which is used as an artificial sausage casing, since it ensures a constant calibration thereof.

The viscose solution which is preferably used for the manufacture of tubings contain about 86% by weight of water, about 5% by weight of sodium hydroxide solution, about 2% by weight of carbon disulfide and about 7% by weight of cellulose; its gamma value is 30 (xanthate groups per 100 glucose units).

If, within the scope of the present specification, the characterization "capable of permanently plasticizing cellulose hydrate" is used with reference to an additive the expression "permanent", is intended to denote that the chemical agents which are designated in this way and which are incorporated into shaped articles according to the present invention are not extractable, or substantially not extractable, from these articles by means of water; the expression "substantially not extractable by water" is here to be understood to denote that, relative to the total amount of the chemical agent in the shaped article, only a negligibly small amount of this agent is transferred at the most from this article into the extracting agent and that, in the course thereof, the properties of the shaped article resulting from the presence of the chemical agent therein, are not measurably altered.

The invention will now be further described by the following examples.

EXAMPLE 1

28.9 g of an aqueous dispersion containing dispersed therein 25% by weight of a mixture of glycerol monostearate/polyethylene glycol-1000 monostearate in a ratio of 1:1 (=10% by weight of dispersed material, relative to the amount of cellulose) are added, whilst stirring vigorously, to 1 kg of an alkaline viscose solution (cellulose content 7.23%; alkali content 5.68%; gamma value 32.8; NaCl ripening value 1.75; viscosity in a falling ball viscometer 188 seconds) and are uniformly mixed therewith.

A paper fiber tubing (diameter 60 mm) is then impregnated and coated with the resulting modified alkaline viscose solution by means of a conventional coating die. The coating of fiber tubing with a viscose-containing solution is described in the British Pat. No. 1,259,666, the disclosure of which is hereby incorporated by reference.

The tubing emerging from the die slit of the coating device is then forced into a precipitating bath which is known in the art under the name "Müller bath".

Subsequently thereto, the tubing is passed through a conventional regenerating bath and then through a wash liquid (water) in a known manner.

After the washing procedure, the tubing is guided in a flat-laid form through a trough which is filled with a liquid of the following composition: 12% by weight of glycerol, 5% by weight of 1,3-dimethylol-4,5-dihydroxyimidazolidin-2-one and 83% by weight of water.

The pH value of the above liquid is adjusted to 2.5 by adding an appropriate amount of sulfuric acid.

The above liquid is allowed to act on the tubing for a period of 2 minutes. Subsequently, the tubing is provided with an inside layer of an epichlorohydrin-polyaminepolyamide resin by applying a 1% solution of this resin to the inside of the tubing in a known manner which is described in the British Pat. No. 1,201,830, the disclosure of which is hereby incorporated by reference. The tubing is then dried in the inflated state in a known manner by applying sufficient heat to the tubing so that it is heated to a temperature of about 100° C.

Subsequently, a liquid layer of an aqueous dispersion containing 8% by weight of a copolymer which is formed by copolymerization of a mixture containing 88% by weight of vinylidene chloride, 3% by weight of acrylic acid, 7.5% by weight of acrylonitrile, and 1.5% by weight of methyl acrylate is applied to the inside of the tubing.

The tubing is then dried by heating. Subsequently, the dried tubing is adjusted to a water content of 12% by weight, relative to its total weight, by moistening it with water.

The use of an epichlorohydrin-polyamine-polyamide resin is a pre-anchoring coating is described in the British Pat. No. 1,417,419, the disclosure of which is hereby incorporated by reference.

The properties of the thus prepared tubing are shown in Table I below:

TABLE I

| Properties | | Comparative tubing | Tubing according to the Example 1 |
|---|---|---|---|
| Breaking length, longitudinal | m | 3,625 | 3,800 |
| Breaking length, transverse | m | 3,500 | 3,550 |
| Elongation at break, longitudinal | % | 34 | 28 |
| Elongation at break, transverse | % | 38 | 32 |
| Bursting pressure | m water gauge | 11.0 | 11.5 |
| Unit weight per $m^2$ | g | 102 | 104 |
| Plasticizer | % | 21 | 20 |
| Swelling value | % | 110 | 91 |
| Wet shrinkage, longitudinal | % | 11 | 4 |

TABLE I-continued

| Properties | | Comparative tubing | Tubing according to the Example 1 |
|---|---|---|---|
| Wet shrinkage, transverse | % | 15 | 7 |
| Moisture | % | 10-12 | 10-12 |

The comparative tubing is prepared according to the procedure as indicated in the Example 1, yet using an aqueous alkaline viscose solution. After the washing procedure, the comparative tubing is treated with an aqueous glycerol solution (12% by weight).

EXAMPLE 2

A tube is prepared as is described in Example 1, but using an aqueous dispersion containing 25% by weight of glycerol monostearate in place of the aqueous dispersion containing 25% by weight of a mixture of glycerol monostearate/polyethylene glycol-1000 monostearate in a ratio of 1:1.

EXAMPLE 3

A tube is prepared as is described in Example 1, but using an aqueous dispersion containing 25% by weight of glycerol distearate in place of the aqueous dispersion containing 25% by weight of a mixture of glycerol monostearate/polyethylene glycol-1000 monostearate in a ratio of 1:1.

EXAMPLE 4

A tube is prepared as is described in Example 1, but using an aqueous dispersion containing 25% by weight of polyethylene glycol-1000 monostearate in place of the aqueous dispersion containing 25% by weight of a mixture of glycerol monostearate/polyethylene glycol-1000 monostearate in a ratio of 1:1.

EXAMPLE 5

A tube is prepared as is described in Example 1, but using an aqueous dispersion containing 25% by weight of polyethylene glycol-1000 distearate in place of the aqueous dispersion containing 25% by weight of a mixture of glycerol monostearate/polyethylene glycol-1000 monostearate in a ratio of 1:1.

EXAMPLE 6

A tube is prepared as is described in Example 1, but using an aqueous dispersion containing 25% by weight of a mixture of glycerol distearate and polyethylene glycol-1000 distearate in place of the aqueous dispersion containing 25% by weight of a mixture of glycerol monostearate and polyethylene glycol-1000 monostearate in a ratio of 1:1.

EXAMPLE 7

43.4 g of an aqueous dispersion containing dispersed therein, 25% by weight of a mixture of glycerol monostearate/polyethylene glycol-1000 stearate in a ratio of 1:1 (=15% by weight, relative to the amount of cellulose), are added, with simultaneous stirring, to 1 kg of the viscose solution indicated in Example 1. The resulting mixture is precipitated into a tube-shaped body by the further procedure in accordance with Example 1. After washing the tubing with water, it is treated with an aqueous solution of the following composition: 12% by weight of glycerol, 5% by weight of 1,3-dimethylolimidazolidin-2-one and 83% by weight of water.

The pH value of the aqueous liquid is adjusted to 2.2 (by adding an appropriate amount of $H_2SO_4$ thereto).

The aqueous solution is contacted with the tubing for a period of 3 minutes and 30 seconds.

The further treatment of the tubing is carried out as indicated in Example 1.

The thus prepared tubing is characterized by the data indicated in the Table II below:

TABLE II

| Properties | | Comparative tubing | Tubing according to the Example 7 |
|---|---|---|---|
| Breaking length, longitudinal | m | 3,750 | 3,400 |
| Breaking length, transverse | m | 3,600 | 3,150 |
| Elongation at break, longitudinal | % | 32 | 22 |
| Elongation at break, transverse | % | 36 | 30 |
| Bursting pressure | m water gauge | 11.5 | 11.2 |
| Unit weight per $m^2$ | g | 104 | 103 |
| Plasticizer | % | 22 | 21 |
| Swelling value | % | 112 | 89 |
| Wet shrinkage, longitudinal | % | 10 | 3.8 |
| Wet shrinkage, transverse | % | 14.5 | 5.2 |
| Moisture | % | 10-12 | 10-12 |

The comparative tubing is manufactured as indicated in Example 1.

When used as an artificial sausage casing, the tubing of Example 7 can be processed without difficulty.

EXAMPLE 8

29.2 g of an aqueous dispersion containing dispersed therein 24% by weight of stearylamide-bis-dimethylenetriazinone-tetramethylol (10% by weight of dispersed material, relative to the amount of cellulose) is added, whilst stirring vigorously, to 1 kg of an alkaline viscose solution (cellulose content 7.1%; alkali content 5.8%; gamma value 29.4; NaCl ripening value 2.5; viscosity in a falling ball viscometer 123 seconds) and uniformly mixed therewith.

A paper fiber tubing (diameter 60 mm) is then impregnated and coated with this liquid mixture corresponding to Example 1.

The further treatment of the tubing is as indicated in Example 1.

After the washing procedure, the flat-laid tubing is guided through a trough which is filled with a liquid of the following composition: 12% by weight of glycerol, 5% by weight of tetramethylolacetylene-diurea and 83% by weight of water.

The pH value of the solution is adjusted to 2.5 by adding an appropriate amount of sulfuric acid thereto.

After being treated with this impregnating liquid, the tubing is further treated as indicated in Example 1.

The thus prepared tubing has the properties as indicated in the Table III below:

TABLE III

| Properties | | Comparative tubing | Tubing according to the Example 8 |
|---|---|---|---|
| Breaking length, longitudinal | m | 3,800 | 3,900 |

TABLE III-continued

| Properties | | Comparative tubing | Tubing according to the Example 8 |
|---|---|---|---|
| Breaking length, transverse | m | 3,650 | 3,750 |
| Elongation at break, longitudinal | % | 34 | 32 |
| Elongation at break, transverse | % | 40 | 34 |
| Bursting pressure, | m water gauge | 12.0 | 12.2 |
| Unit weight per m² | g | 108 | 106 |
| Plasticizer | % | 24 | 22 |
| Swelling value | % | 115 | 96 |
| Wet shrinkage, longitudinal | % | 12.6 | 5.6 |
| Wet shrinkage, transverse | % | 13.4 | 7.5 |
| Moisture | % | 10-12 | 10-12 |

The tubing manufactured according to Example 8 can be processed without difficulty, when it is used as an artificial sausage casing in the shirred and tied form.

A tubing manufactured according to Example 8 can be used with particular advantage as an artificial casing for liver sausages.

While the invention has now been described in terms of certain preferred embodiments, the skilled artisan will readily appreciate that various substitutions, modifications, changes, and omissions may be made without departing from the spirit thereof. Accordingly, it is intended that the scope of the present invention be limited solely by that of the following claims.

What is claimed is:

1. A shaped article comprising a plasticized, chemically-modified cellulose composition of high mechanical strength, said composition being produced by the steps of:
   (a) preparing a viscose solution containing a plasticity-enhancing amount of at least one plasticizing alkyl derivative containing at least one alkyl group having from about 8 to about 24 carbon atoms, said alkyl derivative being selected from the group consisting of alkylamido-bis-dimethylene-triazinone-tetramethylol, alkyl-amino-bis-dimethylene-triazinonetetramethylol, a substantially water-insoluble ester of an aliphatic monocarboxylic acid containing from about 9 to about 25 carbon atoms with a polyalcohol comprising at least two hydroxy groups at least one of which is esterified with said aliphatic monocarboxylic acid, and a mixture thereof;
   (b) precipitating said viscose solution to produce a cellulose hydrate composition in the gel-state containing a plasticity-enhancing amount of said plasticizing alkyl derivative; and
   (c) treating said cellulose hydrate composition in the gel-state with at least one cyclic urea compound having at least two N-methylol groups, to incorporate into said cellulose hydrate composition an amount of said urea compound sufficient to provide for a mechanical strength enhancing degree of crosslinking; and
   (d) heating the treated cellulose hydrate composition to an extent sufficient to crosslink the cellulose hydrate molecules with said urea compound.

2. The shaped article as defined in claim 1, wherein said cyclic urea compound has the formula

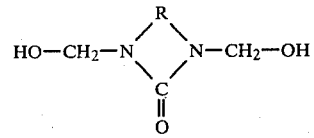

wherein R is selected from the group consisting of —CH₂—CH₂—, —CH₂—CH₂—CH₂—, —CH₂—O—CH₂—, —CH₂—CH₂—NH—, —CH₂—NH—CH₂—, which is unsubstituted or substituted by lower alkyl, hydroxy or lower hydroxy alkyl groups and

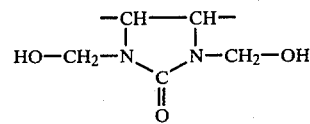

3. The shaped article as defined by claim 1, wherein said cyclic urea compound is selected from dimethylol-ethylene-triazinone, 3,5-dimethylol-3,5-diaza-tetrahydropyrone-4, dimethylol-hydroxy-propylene-urea, dimethylol-tetramethyl-propylene-urea, dimethylol-ethylene-urea (1,3-dimethylol-imidazolidone-2), dimethylol-dihydroxy-ethylene-urea (1,3-dimethylol-4,5-dihydroxy-imidazolidone-2), tetramethylol-acetylene-diurea, dimethylol-propylene-urea and a mixture thereof.

4. The shaped article as defined in claim 1, which further comprises water.

5. The shaped article as defined in claim 1, which further comprises a secondary plasticizer.

6. The shaped article as defined in claim 4, wherein the cyclic urea compound is tetramethylol-acetylene-diurea.

7. The shaped article as defined in claim 4 wherein the cyclic urea compound is 1,3-dimethylol-4,5-dihydroxyimidazolin-2-one.

8. The shaped article as defined in claim 1 wherein the plasticizing alkyl derivate comprises said ester.

9. The shaped article as defined in claim 1 wherein the alkyl in the plasticizing alkyl derivative contains from 15 to 18 carbon atoms.

10. The shaped article as defined in claim 8, wherein the aliphatic monocarboxylic acid contains from about 16 to about 18 carbon atoms.

11. The shaped article as defined in claim 8, wherein the polyalcohol is an aliphatic alcohol.

12. The shaped article as defined in claim 11 wherein the polyalcohol is a lower alkyl polyol containing from about 2 to about 6 carbon atoms, and from about 2 and to about 6 hydroxy groups.

13. The shaped article as defined in claim 11, wherein the polyalcohol is a polyether of a lower alkyl polyol.

14. The shaped article as defined in claim 13, wherein the polyalcohol is a polyalkylene glycol of the general formula

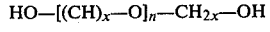

wherein n is an integer of from 1 to about 50, and x is 2 or 3.

15. The shaped article as defined in claim 8, wherein at least one hydroxy group of the polyalcohol in the ester is esterified with a carboxylic acid containing a second functional group selected from the group consisting of hydroxy and carboxyl.

16. The shaped article as defined in claim 15, wherein the carboxylic acid containing a second functional group comprises from about 2 to about 8 carbon atoms.

17. The shaped article as defined in claim 8, wherein the ester is glycerol monostearate.

18. The shaped article as defined in claim 8, wherein the ester is glycerol distearate.

19. The shaped article as defined in claim 8, wherein the ester is polyethylene glycol-1000 monostearate.

20. The shaped article as defined in claim 8, wherein the ester is polyethylene glycol-1000 distearate.

21. The shaped article as defined in claim 8, wherein the ester is polyethylene glycol-200 monostearate.

22. The shaped article as defined in claim 8, wherein the plasticizing alkyl derivate comprises a mixture of glycerol monostearate and polyethylene glycol-1000 monostearate in a ratio of 1:1.

23. The shaped article as defined in claim 15, wherein the ester is an esterified glycerol in which one OH-group is esterified with stearic acid and a further OH-group is esterified with lactic acid or citric acid.

24. The shaped article as defined in claim 15, wherein the ester is an esterified polyethylene glycol-1000 in which one OH-group is esterified with stearic acid and a further OH-group is esterified with a hydroxycarboxylic acid selected from the group consisting of lactic acid and citric acid.

25. The shaped article as defined in claim 1, wherein the plasticizing alkyl derivative comprises stearylamido-bis-dimethylene-triazinone-tetramethylol.

26. The shaped article as defined claim 3, wherein the plasticizing alkyl derivative comprises a mixture of glycerol monostearate and stearylamido-bis-triazinone-tetramethylol.

27. The shaped article as defined in claim 1 wherein the plasticizing alkyl derivative comprises stearylamino-bis-dimethylene-triazinone-tetramethylol.

28. The shaped article as defined in claim 27, wherein the plasticizing alkyl derivate comprises a mixture of stearylamino-bis-dimethylene-tetramethylol and glycerol monostearate.

29. The shaped article as defined in claim 4, wherein the secondary plasticizer is a water soluble polyalcohol.

30. The shaped article as defined in claim 29, wherein the secondary plasticizer is a lower alkyl polyol.

31. The shaped article as defined in claim 30, wherein the secondary plasticizer is a polyethylene glycol.

32. The shaped article as defined in claim 29, wherein the secondary plasticizer is selected from the group consisting of glycerol, glycol and polyglycol.

33. The shaped article as defined in claim 1, which contains from about 0.5 to about 40% by weight of the plasticizing alkyl derivative relative to the amount of cellulose.

34. The shaped article as defined in claim 3, which further comprises a secondary plasticizer.

35. The shaped article as defined in claim 3, which comprises from about 5 to about 25% by weight of water.

36. The shaped article as defined in claim 1, shaped as a film or a tube.

37. The shaped article as defined in claim 36, adapted for food packaging.

38. The shaped article as defined in claim 37, in the form of a sausage casing.

39. The shaped article as defined in claim 38 which further comprises a water impermeable polymer coating on its inner side.

40. The shaped article as defined in claim 38 which further comprises a reinforcement of a fibrous material therein.

41. A process for preparing the shaped article comprising a plasticized chemically modified cellulose composition as defined in claim 1 which comprises the steps of
(a) mixing a viscous containing solution and a liquid comprising at least one plasticizing alkyl derivative which comprises at least one alkyl containing from about 8 to about 24 carbon atoms and which is selected from the group consisting of alkylamido-bis-dimethylene-triazinone-tetramethylol, alkylamino-bis-dimethylene-triazinone-tetramethylol, a substantially water insoluble ester of an aliphatic monocarboxylic acid containing from about 9 to about 25 carbon atoms, and a polyalcohol comprising at least two hydroxy groups at least one of which is esterified with said aliphatic monocarboxylic acid, and mixtures thereof, to form a liquid mixture;
(b) introducing the liquid mixture through the shaping orifice of a die into a precipitating liquid to precipitate a shaped body comprising the hydrated cellulose in a gel state and a plasticity enchancing amount of said plasticizing alkyl derivative;
(c) washing the precipitated shaped body in the gel state;
(d) treating the washed shaped body in the gel state with an acidic aqueous solution containing at least one cyclic urea compound having at least two N-methylol groups to incorporate into the shaped body a sufficient amount of the cyclic urea derivative to provide for a mechanical strength enhancing degree of crosslinking, and
(e) heat treating the treated shaped body to obtain a dried shaped article comprising the plasticized chemically modified cellulose composition of high mechanical strength.

42. The process as defined in claim 41 wherein the acidic aqueous solution further comprises a water soluble plasticizer.

43. The process as defined in claim 41 which further comprises the step of adjusting the water content of the dried shaped article.

44. The process as defined in claim 41, which comprises adjusting the water content of the shaped article by moistening it with water.

45. The process as defined in claim 43, which comprises to impart to the shaped article, a water content of between about 4 and about 25% by weight.

46. The process as defined in claim 41, wherein the liquid comprises said ester.

47. The process as defined in claim 46, wherein the aliphatic monocarboxylic acid contains from about 16 to about 18 carbon atoms.

48. The process as defined in claim 46, wherein the polyalcohol is an aliphatic alcohol.

49. The process as defined in claim 48, wherein the polyalcohol is a lower alkyl polyol containing from about 2 to about 6 carbon atoms, and two to about six hydroxy groups.

50. The process as defined in claim 48, wherein the polyalcohol is a polyether of a lower alkyl polyol.

51. The process as defined in claim 50, wherein the polyalcohol is a polyalkylene glycol of the general formula

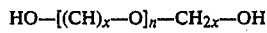

wherein n is an integer of from 1 to about 50, and x is 2 or 3.

52. The process as defined in claim 46, wherein at least one hydroxy group of the polyalcohol in the ester is esterified with a carboxylic acid containing a second functional group selected from the group consisting of hydroxy and carboxyl.

53. The process as defined in claim 1, wherein the carboxylic acid containing a second functional group comprises from about 2 to about 8 carbon atoms.

54. The process as defined in claim 46, wherein the ester is glycerol monostearate.

55. The process as defined in claim 46, wherein the ester is glycerol distearate.

56. The process as defined in claim 46, wherein the ester is polyethylene glycol-1000 monostearate.

57. The process as defined in claim 46, wherein the ester is polyethylene glycol-1000 distearate.

58. The process as defined in claim 53, wherein the ester is an esterified glycerol in which one OH-group is esterified with stearic acid and a further OH-group is esterified with lactic acid or citric acid.

59. The process as defined in claim 53, wherein the ester is an esterified polyethylene glycol-1000 in which one OH-group is esterified with stearic acid and a further OH-group is esterified with a hydroxycarboxylic acid selected from the group consisting of lactic acid and citric acid.

60. The process as defined in claim 46, wherein the liquid comprises a mixture of glycerol monostearate and polyethylene glycol-1000 monostearate in ratio of 1:1.

61. The process as defined in claim 46, wherein the liquid comprises stearylamido-bis-dimethylene-triazinone-tetramethylol.

62. The process as defined in claim 61, wherein the liquid comprises a mixture of glycerol monostearate and stearylamido-bis-triazinone-tetramethylol.

63. The process as defined in claim 46, wherein the liquid comprises stearylamino-bis-dimethylene-triazinone-tetramethylol.

64. The process as defined in claim 63, wherein the liquid comprises a mixture of stearylamino-bis-dimethylene-triazinone-tetramethylol and glycerol monostearate.

65. The process as defined in claim 41, wherein said cyclic urea compound has the formula

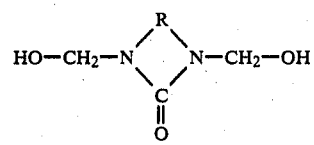

wherein R is a chain selected from the group consisting of —CH$_2$—CH$_2$—, —CH$_2$—CH$_2$—CH$_2$—, —CH$_2$—O—CH$_2$—, —CH$_2$—CH$_2$—NH—, lower alkyl, hydroxy or lower hydroxy alkyl groups and

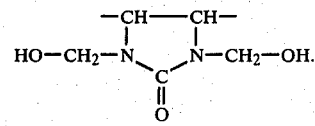

66. The process as defined in claim 65, wherein the cyclic dimethylolurea derivative is tetramethylolacetylenediurea.

67. The process as defined in claim 65, wherein the cyclic dimethylolurea derivative is 1,3-dimethylol-4,5-dihydroxy-imidazolin-2-one.

68. The process as defined in claim 42, wherein the plasticizer is a water soluble polyalcohol.

69. The process as defined in claim 68, wherein the plasticizer is a lower alkyl polyol.

70. The process as defined in claim 68, wherein the plasticizer is a polyethylene glycol.

71. The process as defined in claim 68, wherein the plasticizer is selected from the group consisting of glycerol, glycol and polyglycol.

72. The process as defined in claim 41, wherein the liquid mixture comprises from about 0.5 to about 40% by weight of the plasticizing alkyl derivative relative to the amount of cellulose therein.

73. The process as defined in claim 41 wherein the acidic solution comprises from about 0.5 to about 20% by weight of the cyclic dimethylol urea derivative.

74. The process as defined in claim 41, wherein the shaped body is a tube-shaped body.

75. The process as defined in claim 1, which further comprises the step of applying the liquid mixture to a tube of a nonwoven fiber material.

76. The process as defined in claim 41, which further comprises the step of applying to a tube-shaped article an inner layer of a water vapor impermeable polymer coating.

77. A method of preparing sausages which comprises the step of filling a sausage material into a tube-shaped article as defined in claim 38.

* * * * *